(12) United States Patent
Desmeure et al.

(10) Patent No.: US 11,244,093 B2
(45) Date of Patent: Feb. 8, 2022

(54) METHOD FOR MODELLING AN ELEMENT OF A STRUCTURE USING FINITE ELEMENTS

(71) Applicants: Safran Aircraft Engines, Paris (FR); CENTRE NATIONAL DE LA RECHERCHE SCIENTIFIQUE (CNRS), Paris (FR)

(72) Inventors: Geoffrey Juan Desmeure, Moissy-Cramayel (FR); Maxime Guy Roland Blanchard, Moissy-Cramayel (FR); Olivier Francois Gerard Allix, Boulogne-Billancourt (FR); Pierre Noel Gosselet, Paris (FR)

(73) Assignees: Safran Aircraft Engines, Paris (FR); CENTRE NATIONAL DE LA RECHERCHE SCIENTIFIQUE (CNRS), Paris (FR)

(*) Notice: Subject to any disclaimer, the term of this patent is extended or adjusted under 35 U.S.C. 154(b) by 851 days.

(21) Appl. No.: 15/923,126

(22) Filed: Mar. 16, 2018

(65) Prior Publication Data

US 2019/0286769 A1    Sep. 19, 2019

(51) Int. Cl.
*G06F 30/23* (2020.01)
*G06F 111/10* (2020.01)

(52) U.S. Cl.
CPC .......... *G06F 30/23* (2020.01); *G06F 2111/10* (2020.01)

(58) Field of Classification Search
CPC ................ G06F 30/23; G06F 2111/10
See application file for complete search history.

(56) References Cited

U.S. PATENT DOCUMENTS

2012/0245862 A1* 9/2012 Coudouent ............ G06F 30/23
702/42

OTHER PUBLICATIONS

Kim, J., and Duarte, C. A. (2015) A new generalized finite element method for two-scale simulations of propagating cohesive fractures in 3-D. Int. J. Numer. Meth. Engng, 104: 1139-1172. May 2015 (Year: 2015).*

(Continued)

*Primary Examiner* — Boris Gorney
*Assistant Examiner* — Michael Edward Cocchi
(74) *Attorney, Agent, or Firm* — Oblon, McClelland, Maier & Neustadt, L.L.P.

(57) ABSTRACT

A method simulates behavior of a structure by finite element calculation in which a global model represents the structure, a local model represents an area of the structure including geometric details, and an auxiliary model represents the area without the geometric details. The method includes determining by finite element calculation in the global model of a nodal displacement field corresponding to a loading applied to the global model; applying the nodal displacement field to the local and auxiliary models and determining the corresponding forces; calculating a correction when convergence of the solution obtained for the global model is not achieved, and the applying is resumed with a nodal displacement field calculated in the global model after implementing the correction; determining values of internal variables for the different loading increments; and assessing the evolution in the behavior of the structure over time as a function of these values.

16 Claims, 8 Drawing Sheets

(56) References Cited

OTHER PUBLICATIONS

Barbarella E., Allix O., Daghia F., Lamon J., Jollivet T. A new inverse approach for the localization and characterization of defects based on compressive experiments Comput. Mech., 57 (6) (2016), pp. 1061-1074 (Year: 2016).*

Gendre, L., Allix, O., Gosselet, P. et al. Non-intrusive and exact global/local techniques for structural problems with local plasticity. Comput Mech 44, 233-245 (2009). (Year: 2009).*

Duval, Mickael and Passieux, Jean-Charles and Salaün, Michel and Guinard, Stéphane Non-Intrusive model coupling: A flexible way to handle local geometric and mechanical details in FEA. (In Press: 2014) In: Joint conference on Mechanical, Design Engineering & Advanced Manufacturing, Jun. 18, 2014 (Year: 2014).*

Y.J. Liu, Q. Sun, X.L. Fan, A non-intrusive global/local algorithm with non-matching interface: Derivation and numerical validation, Computer Methods in Applied Mechanics and Engineering, vol. 277, pp. 81-103 (Year: 2014).*

French Preliminary Search Report dated Sep. 22, 2017 in corresponding Patent Application No. 1662454 (with English Translation of Category of Cited Documents) citing documents AX, AY, and AZ therein, 4 pages.

Lionel Gendre et al., "Non-intrusive and Exact Global/Local Techniques for Structural Problems with Local Plasticity", Computational Mechanics, vol. 44, No. 2, XP019717949, Feb. 10, 2009, pp. 233-245.

Lionel Gendre, "Approche Globale / Locale Non-intrusive: Application Aux Structures Avec Plasticite Localisee", XP055396273, Jan. 22, 2010, 219 pages.

Y.J. Liu et al: "A Non-intrusive Global/Local Algorithm with Non-matching Interface: Derivation and Numerical Validation", Computer Methods in Applied Mechanics and Engineering, vol. 277, XP055397881, May 1, 2014, pp. 81-103.

* cited by examiner

FIG. 3

FIG. 5A
(a) Complete temporal coupling

FIG. 5B

FIG. 6A
(a) Partial temporal coupling

●—— Initial plane load
× × Refined plane load

FIG. 6B

FIG. 6C

METHOD FOR MODELLING AN ELEMENT OF A STRUCTURE USING FINITE ELEMENTS

FIELD OF THE INVENTION

The present invention relates to the techniques of simulating the behavior of a structure by finite element calculation.

More specifically, the present invention relates to a non-intrusive method of iterative and incremental finite element calculation for the study of nonlinear behaviors of an entire structure.

In particular it is advantageously applied to simulating the behavior of parts in the field of aeronautics and even more particularly to simulating turbine engine parts.

PRIOR ART

Continuous improvement in the performance of turbine engines is leading to operating at increasingly high temperatures (+600° C. at the turbine inlet in 40 years). In order to cope with these increases, designs are incorporating increasingly optimized cooling technologies involving multi-perforations of very small size in relation to the size of the part.

These small holes, or other types of abrupt variations in small scale geometry, are sites where the mechanical stresses undergone by the material are concentrated. These areas, comprising the multi-perforations, are critical for estimating the service life of the part. Indeed, by concentrating the stresses, these are generally the places where the first damage, such as microcracks, appears.

Currently, the size of these geometric variations, very small in relation to the characteristic length of the part or assembly studied, makes their taking into account difficult or partial in the calculations of behavior and estimation of service life. Since the behavior of the parts is estimated by the finite element method, the lattices needed for representing them generate calculation and post-processing times incompatible with designing in the design office, as well as difficulties in storing the results.

Figure 1A:
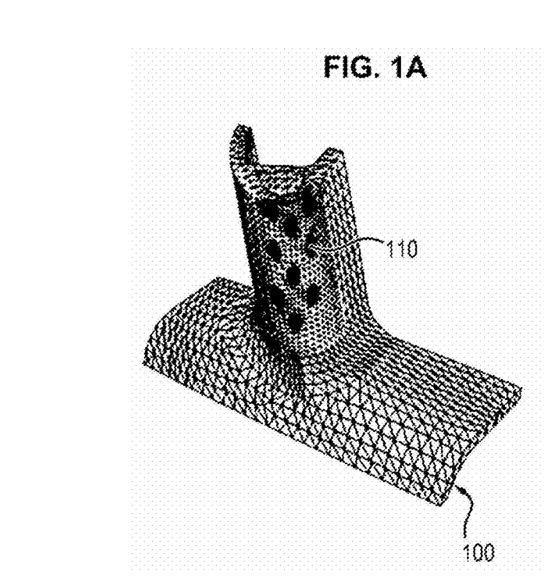
FIG. 1A already introduced, represents a portion of a turbine blading including small sized cooling holes, FIG. 1B already introduced, represents a portion of a combustion chamber wall including small sized cooling holes and perforations.

Thus, by way of example, a turbine blading 100 is illustrated in FIG. 1A including a plurality of very small sized cooling holes 110. These perforations 110 are typically of a diameter less than 0.4 mm. Typically, the ratio between the part 100 to be studied and the holes 110 is from 10² to 10³.

Figure 1B:
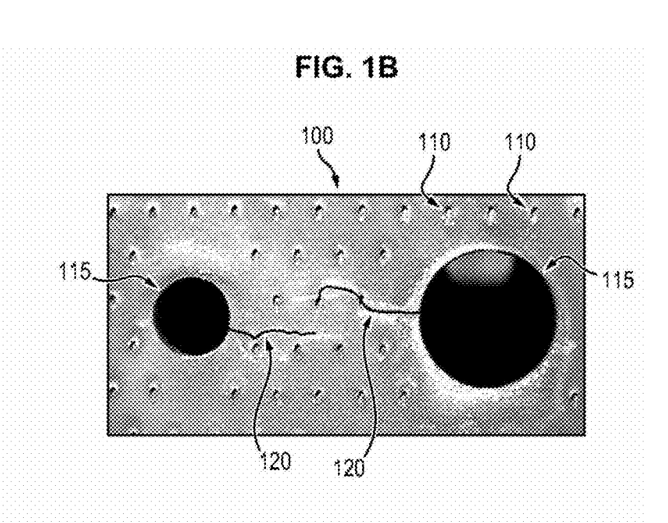

Similarly, by way of example, FIG. 1B represents a detailed view of a combustion chamber wall, comprising a plurality of dilution holes 115.

The wall also comprises a plurality of perforations 110 of the same order of magnitude as the cooling holes 110 in FIG. 1A. The formation of microcracks 120 is also observed from said dilution holes 115. Currently, the dilution holes 115 are represented in the calculations, but the initiation site of the cracks 120, their directions of propagation and the time at the end of which they appear would be better predicted if the perforations 110 were taken into account.

Conventional methods are known implementing zoom techniques where calculations on a global model of the structure influence the calculations on a detailed area of said structure. These methods are not satisfactory since the calculation on the global model does not take any account of the behavior of the detailed area.

Methods are also known (e.g. by domain decomposition) that take into account the behavior of the detailed area on the global model. However, such methods are intrusive, in the sense that they require specific developments regarding the finite element calculation software used.

Non-intrusive approaches have recently been provided, i.e. that are able to be used with any type of finite element software, notably generalist software, for analyzing local nonlinear behaviors.

Reference may be made, for example, to the thesis:
- L. Gendre—Non-intrusive global/local approach: application to structures with local plasticity, 2009 or else to the articles:
- Duval et al.—Non-intrusive coupling: recent advances and scalable nonlinear domain decomposition, 2013
- Y. Liu—A non-intrusive global/local algorithm with non-matching interface: Derivation and numerical validation. 2014.

These techniques, however, only allow the study of nonlinear behaviors (plasticity) in local areas. In addition, the methods provided are limited with regard to the loading increments considered. They do not take into account the evolutions in the way the part is stressed over the whole of an operating cycle or a service life.

DESCRIPTION OF THE INVENTION

One aim of the invention is to provide a method of simulating the behavior of a part that makes it possible to take into account the critical effects of very small scale geometric variations, for determining nonlinear behaviors over the whole of a simulated part, and estimating a service life of said part.

Yet another aim of the invention is to provide a solution which makes it possible to take into account the evolutions in stresses of the various areas of the part studied in the course of an operating cycle or throughout a service life.

Another aim of the invention is to provide a solution making reasonable calculation times possible whilst allowing a reliability and a robustness of results similar to that which would enable an approach with conventional models without calculation time constraints.

Another aim of the invention is further to provide a flexible and modular solution, which allows a non-intrusive implementation and which is capable of being used with any type of finite element calculation software.

Thus, the invention provides a method of simulating the behavior of a structure by iterative and incremental finite element calculation, implemented by a computer including code instructions for executing said method, in which a global model is used representing said structure, a local model representing an area of said structure including geometric details, and an auxiliary model representing the same said area without said geometric details, said method including the following steps:
a) application of a loading to the global model;
b) determination by finite element calculation in the global model of a nodal displacement field corresponding to this loading;
c) application of the nodal displacement field thus determined to the local and auxiliary models and determination of the corresponding forces in said models;
d) test of the convergence of the solution obtained for the global model, and wherein if a convergence indicator is achieved, the processing is resumed at step a) with a loading increment; otherwise,
e) calculation of a correction from the difference between the forces thus determined in the local model and in the auxiliary model and application of this correction in the global model, the processing is resumed at step c) with a nodal displacement field calculated in the global model after implementation of said correction;

f) determination of values of internal variables from the calculations performed in the global model and in the local model for the different loading increments; and g) assessment of the evolution in the behavior of the structure over time as a function of said values of internal variables.

The global/local iterations make it possible to represent plasticity generally extended to the whole of the structure. Thus, through successive corrections of the global model, a plastic area initiated by the structural details may be propagated outside the local area and brought back to the global problem, modifying the general behavior of the part.

Advantageously, but optionally, the method according to the invention may further include at least one of the following features:

- steps c), d) and e) of correction and convergence testing of the global model are applied only to the loading increments corresponding to the instants of the local extrema of the loading;
- the global model models a nonlinear behavior;
- the local and auxiliary models model a nonlinear behavior;
- the local and auxiliary models include a set of peripheral nodes defining a boundary and in which the correction applied to the global model comprises an additional loading on the nodes of the global model located on said boundary;
- the calculation of a correction to be applied to the global model is determined by an overlay of a finite element software program;
- the overlay uses a finite element software recalculation function for moving to the next loading incrementation;
- step c) comprises the use of a convergence acceleration method; and
- the convergence acceleration method is a quasi-Newton method or based on Aitken's $\delta^2$;
- the method makes it possible to simulate the behavior of parts in the field of aeronautics, and more particularly for simulating turbine engine parts.

It further relates to a computer program product including code instructions for executing the method provided.

DESCRIPTION OF THE FIGURES

Other features, aims and advantages of the present invention will appear on reading the following detailed description referring to the appended drawings, given by way of non-restrictive examples, in which.

DETAILED DESCRIPTION OF AT LEAST ONE EMBODIMENT OF THE INVENTION

Figure 2:
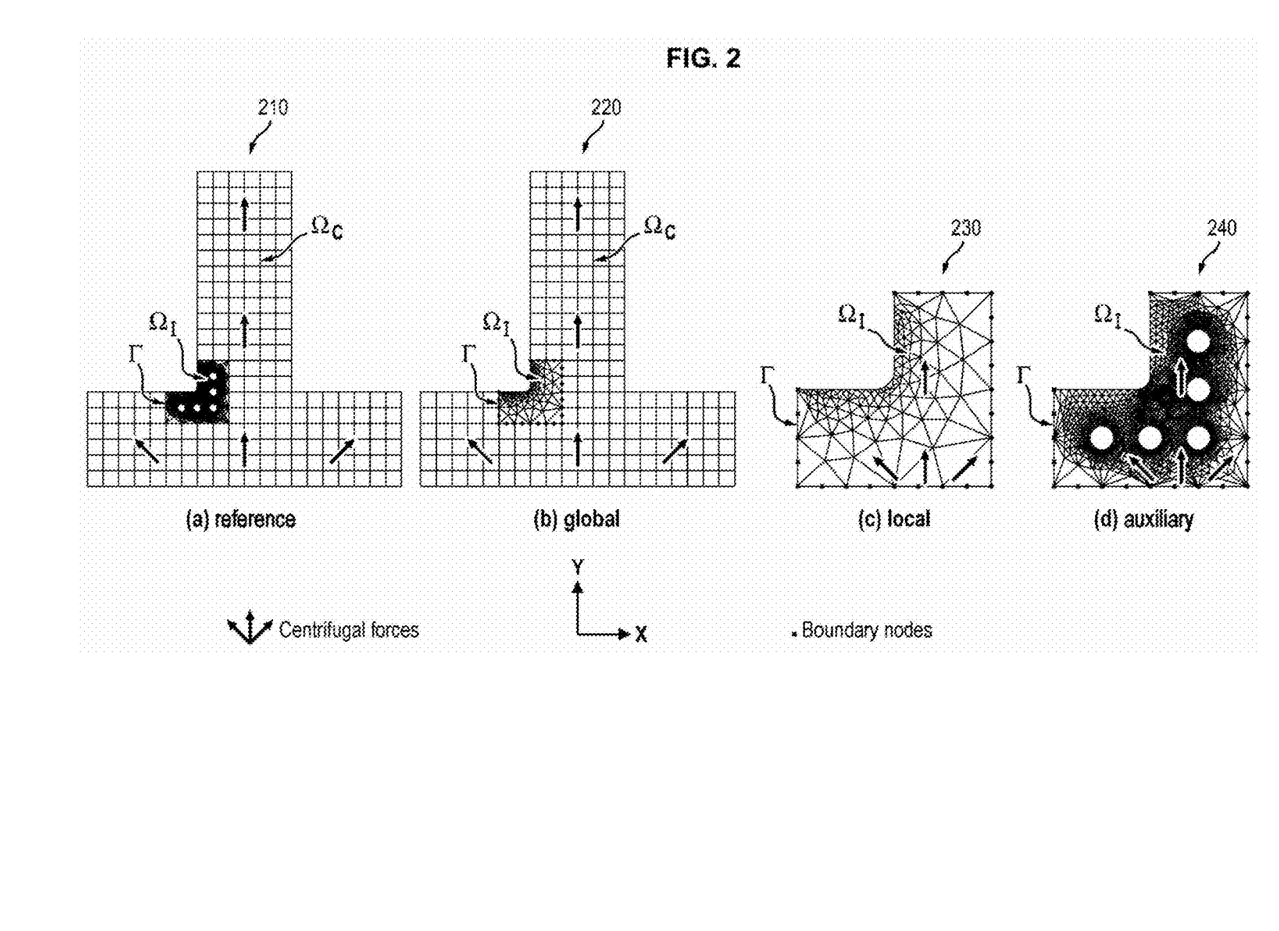
FIG. 2 represents a complete or partial simulation of the turbine blading by in a) a reference model, in b) a global model, in c) a local model, in d) an auxiliary model.

FIG. 2 illustrates the structure simulation models implemented in the non-intrusive method of iterative and incremental finite element calculation.

The structure studied 100 is accordingly separated into two domains:

- an area of interest $\Omega_I$ in which it is intended to take into account the structural details or more generally the geometric variations, it may have two different representations:
  - With the geometric details, it leads to the local model 230. The reference model 210 is obtained by coupling it to the complementary area $\Omega_C$ described below,
  - Without the geometric details, it is a constituent of the global model 220 when it is attached to the complementary area $\Omega_C$. Used alone, it constitutes the auxiliary model 240.
- A complementary area $\Omega_C$ representing the rest of the structure for which no additional information is to be provided.

The method therefore uses three different lattices. Which makes it possible to effectively represent the structure, i.e. to place small costly modeling elements only where they are needed and use coarser modeling elements in less uneven areas. Thus each global and local strategy model remains much less costly to calculate than the complete reference problem.

Iterative Resolution Strategy

Incrementation and Initialization

Figure 3:
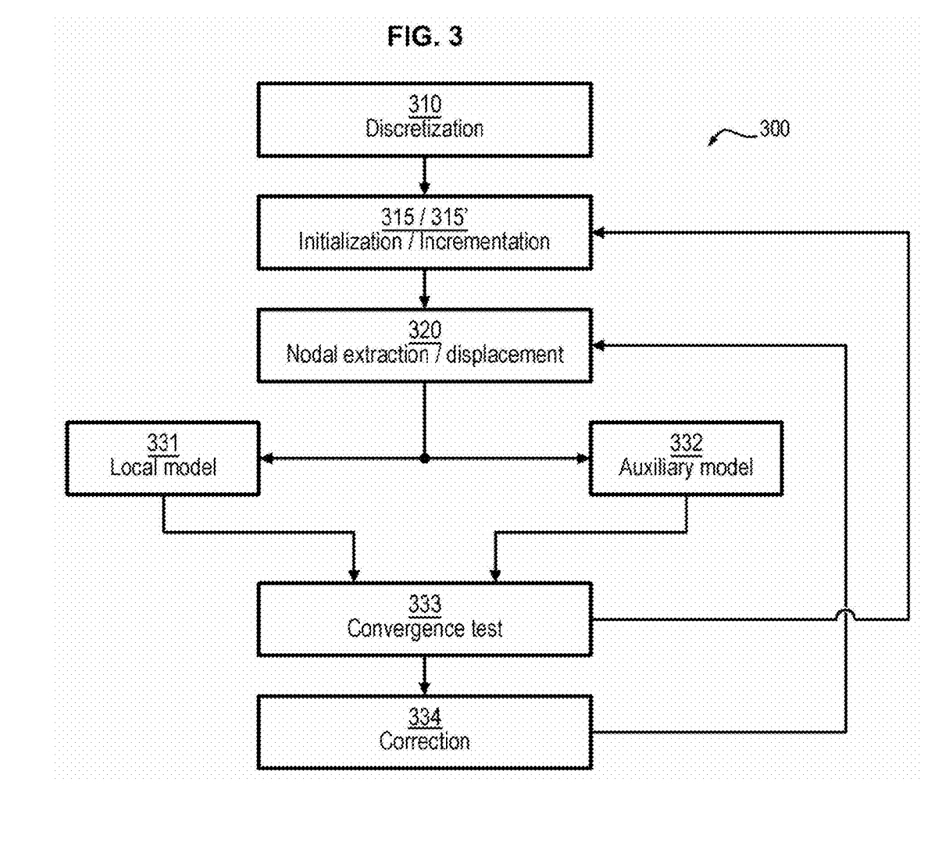
FIGS. 3 and 4 represent the steps of a non-intrusive method of iterative and incremental finite element calculation according to the invention.

FIG. 3 illustrates the steps of the non-intrusive method of iterative and incremental finite element calculation 300 according to the invention.

The resolution of a nonlinear problem requires applying the external loading gradually, by load increment. Thus, time is discretized into time steps, and a load increment corresponds to each time step.

In this case, the load is, for example, the force—which varies over time—applied to the various nodes of the structure. The method of calculation 300 accordingly comprises a step 310 of discretization of the loading applied to the structure 100 (described in detail later). The loading is thus split into loading increments or steps and is applied in successive increments.

It will be noted that for a robust implementation, the time steps of the different models are chosen to be identical.

In a step 315 of initialization of the method, a first loading increment is applied to the global model 220 and the solution of said model 220 is calculated.

Then in a step 320, a nodal displacement field $\mu_\Gamma$ is extracted from the solution of the global model 220.

Global/Local Iterative Resolution Strategy

Figure 4:
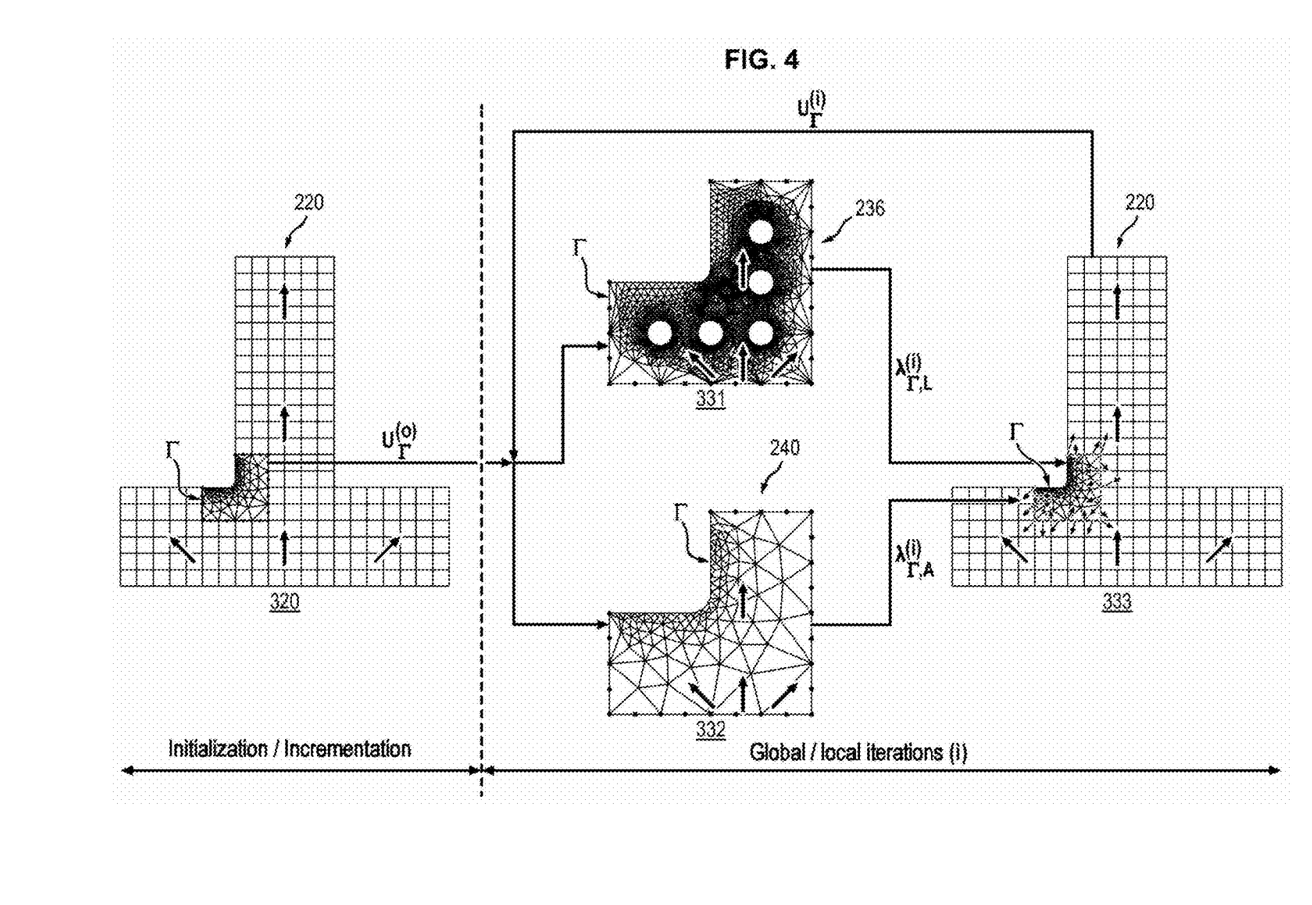

A global/local iterative resolution strategy is then implemented as illustrated with reference to FIGS. 3 and 4.

Accordingly, resolved at each iteration are a calculation applied to the global model 220, a calculation applied to the local model 230 and a calculation applied to the auxiliary model 240.

Thus, for a given iteration the displacement field $\mu_\Gamma$ is applied respectively to the local model 230 and to the auxiliary model 240 (steps 331 and 332).

Given that the displacement field $\mu_\Gamma$ imposed on both models is the same, a disequilibrium will be established between the local 230 and auxiliary 240 model expressing the influence of the geometric details on this area of interest of the structure. At the end of the calculations, two nodal force fields are therefore obtained ($\lambda_{\Gamma,L}$ and $\lambda_{\Gamma,A}$) resulting from the reactions to the displacement limit conditions controlling the local 230 and auxiliary 240 models respectively. The disequilibrium is reflected by the quantity ($\lambda_\Gamma = \lambda_{\Gamma,A} - \lambda_{\Gamma,L}$). Indeed, because of the variation in geometry, the local model 230 is less stiff and deforms more than the auxiliary model 240.

A rebalancing in force between $\lambda_{\Gamma,L}$ and $\lambda_{\Gamma,A}$ is then implemented in a step 334.

Accordingly, an additional loading equal to the quantity $\lambda_\Gamma = \lambda_{\Gamma,A} - \lambda_{\Gamma,L}$ is applied to the loading forces of the global model 220, at the nodes of this model which are located at the boundary (periphery) of the local model 230 or of the auxiliary model 240. This correction step 334 supplies for the whole of the structure (global model) a corrected nodal displacement field taking into account the local geometric details.

The procedure then moves on to the next loading increment at step 315'.

Steps 320 and 334, are subsequently repeated. However, unlike the initialization phase (comprising the initialization step 315), prior to the correction step 334 the method comprises a convergence test step 333.

Convergence Test

In a step 333 (FIG. 3), the convergence of the solution of the corrected global model is tested. Convergence may, for example, be measured by calculating the difference between two loads of successive corrections ($\lambda_\Gamma = \lambda_{\Gamma,A} - \lambda_{\Gamma,L}$). It is estimated that equilibrium is reached between the models when the variation in force between two corrections becomes minimal (e.g. less than 10-4). Convergence may also be measured by the difference between two successive displacement fields $\mu_\Gamma$, the solution being converged when this difference is, for example, less than 10-8.

If the solution is not converged the next global/local iteration is proceeded with by returning to step 320 and using as the nodal displacement field the corrected field resulting from the correction step 334. Consequently, at each iteration, the solution of the global model influences the local and auxiliary models in data on the displacement, while the latter influence the global model by the data on the forces resulting from the reactions to the displacement limit conditions.

If convergence is reached, the procedure moves on to the next loading increment at step 315' of the global model. Each solution of each model then being considered as converged.

In this new incrementation step 315' (termed a recalculation step), each model calculation restarts from the converged solution.

This makes it possible to preserve the equilibrium reached between the local model and the global model at the preceding loading step.

Thus, in this new incrementation step 315', the load incrementation is calculated in relation to the behavior history of the structure, on the basis of the internal variables, such as the state of deformations, the stresses, the state of plasticity or the hardening that characterize the state of the part at a given instant, as determined at the incrementation and at the preceding global/local iterations.

This behavior history, i.e. the evolution of the internal variables over time, is stored for making it possible to characterize nonlinear behavior over the whole of an operating cycle and where appropriate making it possible to estimate a service life.

In another embodiment, a variant of the exchanges between the models is possible by applying to the problems of the local 220 and auxiliary 230 model a linear combination of the nodal forces and displacements, then referred to as a mixed connection technique. This technique is more complex to implement but allows superior performance.

Discretization (Step 310)

The time step of the global model may be chosen particularly fine, in order to be suitable for calculation on the local model and to avoid divergences between the global model and the local model.

The time step of the global model is, for example, divided by a factor of 100 in relation to the time step which would be necessary for the implementation of a global model on the structure, without taking into account local geometric deformations.

As a variant, the discretization chosen for the global model 220 is that determined automatically by the finite element calculation software in the first calculation on the local model 230. Thus, the initial loading is split again according to this new discretization and it is used for all the simulations. This approach may be iterative, and makes it possible to obtain a consistent discretization between the global 220, local 230 and auxiliary 240 models, but limited to the strictly necessary time step.

Controlling the precision of convergence through a strategy of specific temporal incrementation is essential in order to limit the level of error with regard to the solution of the reference model 210, and to ensure the accuracy of the solution. The method may then be repeated over multiple cycles and numerical simulations of fatigue be performed in order to supply service life models.

Acceleration Processing

The method of calculation 300 also implements acceleration processing for reducing the number of global/local iterations and making it possible to meet the temporal constraints while keeping a reasonable calculation time. To achieve this objective, the method of calculation 300 may implement different convergence acceleration methods, such as:

The quasi-Newton methods: Broyden (C. G. Broyden, The convergence of a Class of Double-rank Minimization Algorithms, 1969) and SR1 (Symmetric Rank One) (R. H. Byrd, Analysis of a Symmetric Rank-One Trust Region Method, 1996), BFGS (H. Matthies and G. Strang, The solution of nonlinear finite element equations, 1979); or The methods based on the Aitken's $\delta^2$: classic version (Y. K. Chow and S. Kay, On the Aitken acceleration method for nonlinear problems, 1984), with memorandum and Steffensen's (R. F. King, An efficient one-point extrapolation method for linear convergence, 1980).

These convergence acceleration methods make it possible to reduce the number of iterations needed by approximately 30%, for reaching convergence at each loading increment.

Preferably, the user of the method of calculation 300 may choose the type of the desired method according to their application.

This acceleration processing step preferably takes place after the correction calculation step 334 and is aimed at modifying the displacement field found at this time in order to make it closer to that making it possible to obtain a better equilibrium.

In a dual way, via the local model 230 this will also accelerate and therefore modify the equilibrium forces. It is also necessary to recalculate the reaction force of the complementary portion modified by acceleration. Because of the nonlinearity of the problem it would be necessary to recalculate the global model 220. This is avoided in the present method by using the auxiliary model 240 which will calculate this quantity.

Temporal Optimization of the Global/Local Coupling

In the foregoing, an implementation has mainly been considered where the processing implements global/local iterations at each loading increment.

Figure 5A:
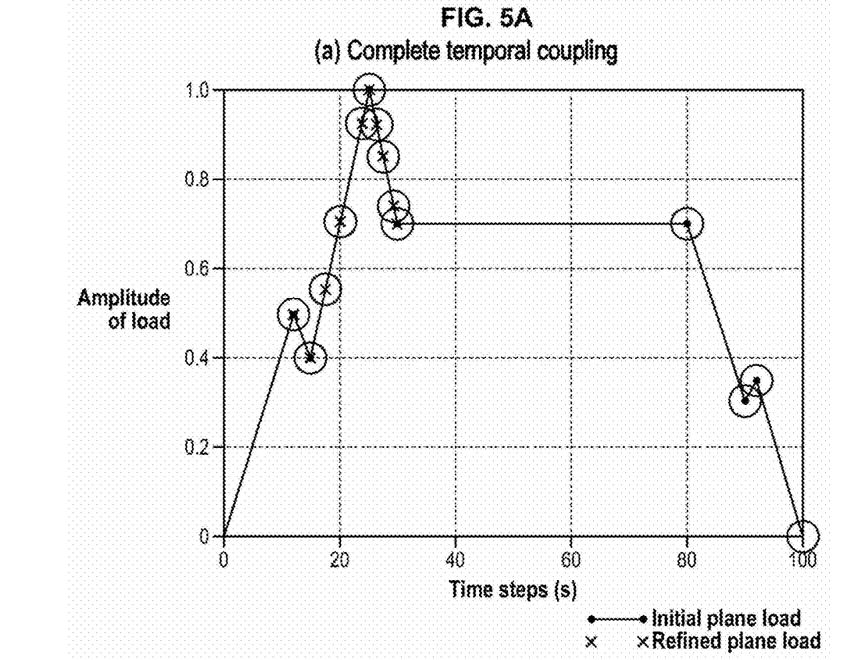
FIGS. 5A and 5B represent a complete temporal coupling between the global and local models in a non-intrusive method of iterative and incremental finite element calculation according to the invention.
Figure 5B:
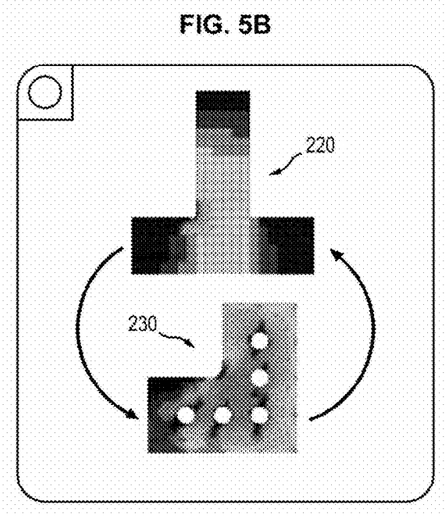

This is what is illustrated in FIGS. 5A and 5B. This condition of equality of time step between the models ensures excellent precision of the method.

As a variant, the iterations between the global model and the local model may only take place for certain loading increments.

Figure 6A:
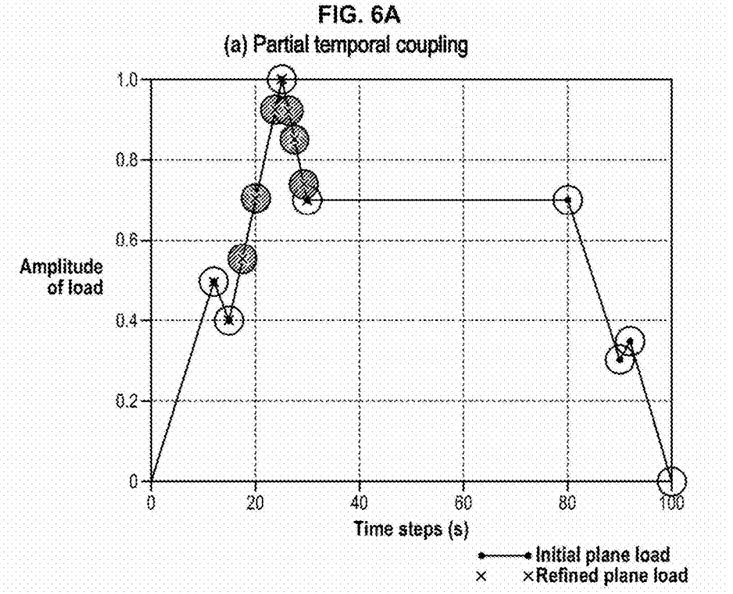
FIGS. 6A, 6B and 6C represent in b) a partial temporal coupling between the global and local models in a non-intrusive method of iterative and incremental finite element calculation according to the invention.
Figure 6B:
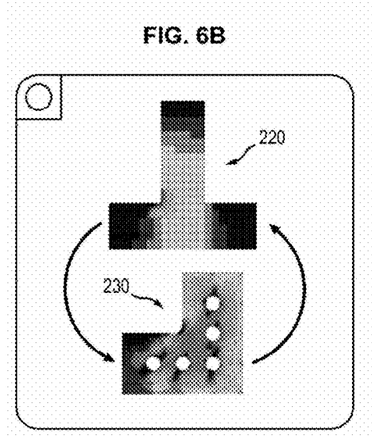
Figure 6C:
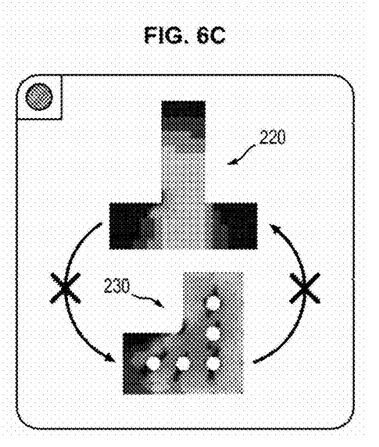

In the example shown in FIGS. 6A, 6B, and 6C, the global-local iterations are only implemented at the local extrema of the loading.

For the other loading increments, the method performs a calculation of the global model (outside of the local area) and a separate calculation of the local model. With reference to FIG. 3, steps 333 and 334 of the method of calculation 300 are therefore not performed.

Thus, the time steps of the local model are smaller than those of the global model and of the auxiliary model (for which it is imperative that the time steps are identical).

This partial temporal coupling technique makes it possible to significantly reduce the calculation times whilst ensuring an acceptable precision. Thus, in the case of high plasticity or when the area of local interest has a strong influence on the complete structure, the strategies of convergence acceleration and partial temporal coupling are particularly suitable for improving the performance of the method of calculation 300.

Software Implementation

Figure 7:
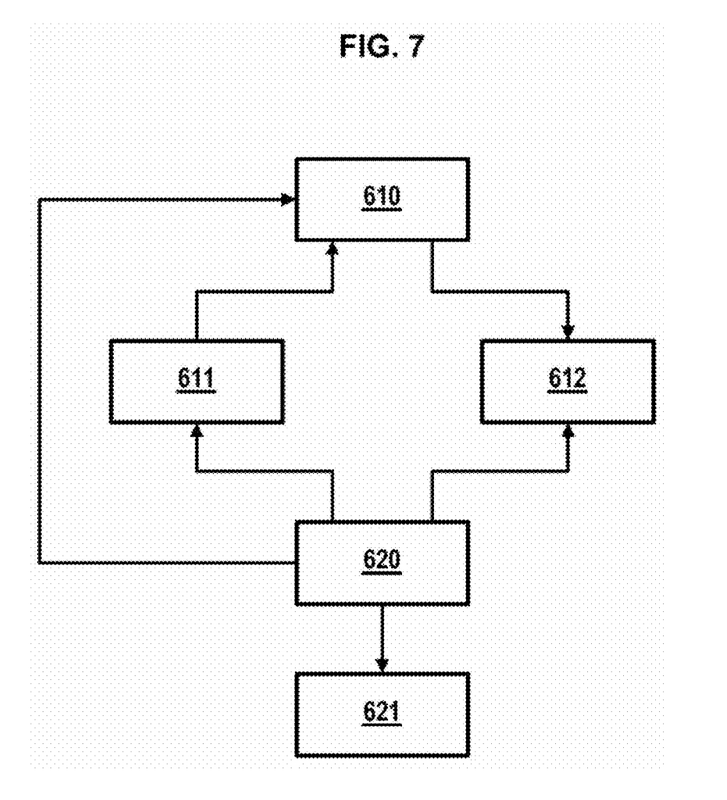
FIG. 7 represents a coupling scheme between a finite element software program and an overlay software program for implementing a non-intrusive method of iterative and incremental finite element calculation according to the invention.

FIG. 7 illustrates the coupling between a finite element software program 610 and an overlay 620 of the software program 610 allowing communication between the various models.

The finite element software program 610 is preferably a generalist commercial software program, such as Abaqus or Code_Aster.

A model of the finite element software program 610 is defined by at least one input file 611. This file 611 comprises the parameters of a model defined by finite elements (lattice, behavior relationships, limit conditions and loading).

The results of the calculations obtained through executing the finite element software program code 610 are written into at least one output file 612.

More particularly, this software program 610 possesses a communication interface for reading information from the results files specific to said software program 610.

The overlay 620 is preferably produced in a scripting language such as Python. This overlay 620 makes it possible to perform mathematical operations or even write control files necessary to the strategy of implementing the non-intrusive method of iterative and incremental finite element calculation 300.

The overlay 620 makes it possible to use the software program 610 as a solver in the service of the strategy via the architecture represented in FIG. 5.

Communications between the various models only take place via this overlay 620 which extracts the various quantities of interest, then reinjects them as control variables of the next calculations. Advantageously, these exchanges remain inexpensive numerically, since they only concern the interfaces of each model (small size in relation to the complete model).

The overlay 620 accomplishes the tasks of:

Reading the calculation results of the solutions to the various models in the output files 612, and extracting the displacement values (extracted from the solution to the global model 220) or the boundary forces (extracted from the solutions of the local 230 and auxiliary 240 models);

Calculating the corrections at the boundaries of the global model 220;

Writing these correction values in the input files 611, these values acting as a control variable for the next calculations;

Checking and validating the calculation as it progresses, through automatic post-processing solutions and calculations of convergence indicators, plots of differences (e.g. for verifying the stagnation of the correction made as the iterations progress);

Controlling recalculation;

Transmissions of the internal variables during recalculation;

Controlling the loading discretization strategy;

Controlling the convergence acceleration strategy;

Writing calculation logs in the results files 621.

The calculations of the next increment are connected to the best converged solutions of the preceding time step by using a recalculation function (e.g. the *Restart function in Abaqus).

The modular and non-intrusive computer implementation with regard to the finite elements solver used, advantageously allows a robust and automated use of the method of calculation 300.

Since the implementation is non-intrusive, the overlay 620 may be easily suited to being used with different finite element software programs 610.

Advantageously, the method makes it possible to obtain a precision not attainable by conventional methods, both at the local level around the structural details and at the level of the entire structure where the influence of these details is no longer insignificant.

Also, the method provides a greater modularity to the intended applications: possibility of simply handling multiple types of small geometric variations (cooling holes, manufacturing defects, damage in service, etc.), possibility of handling multiple local problems (at different sites on the part) simultaneously. These types of studies retain the global model, only the local model has to be modified according to the desired application.

The method of calculation 300 makes it possible to obtain the solution from the reference model 210, thus the behavior of the initial part is obtained directly with the added characteristic feature of only having to modify the local model 230.

Numbering of the Nodes at the Boundaries

Figure 8:
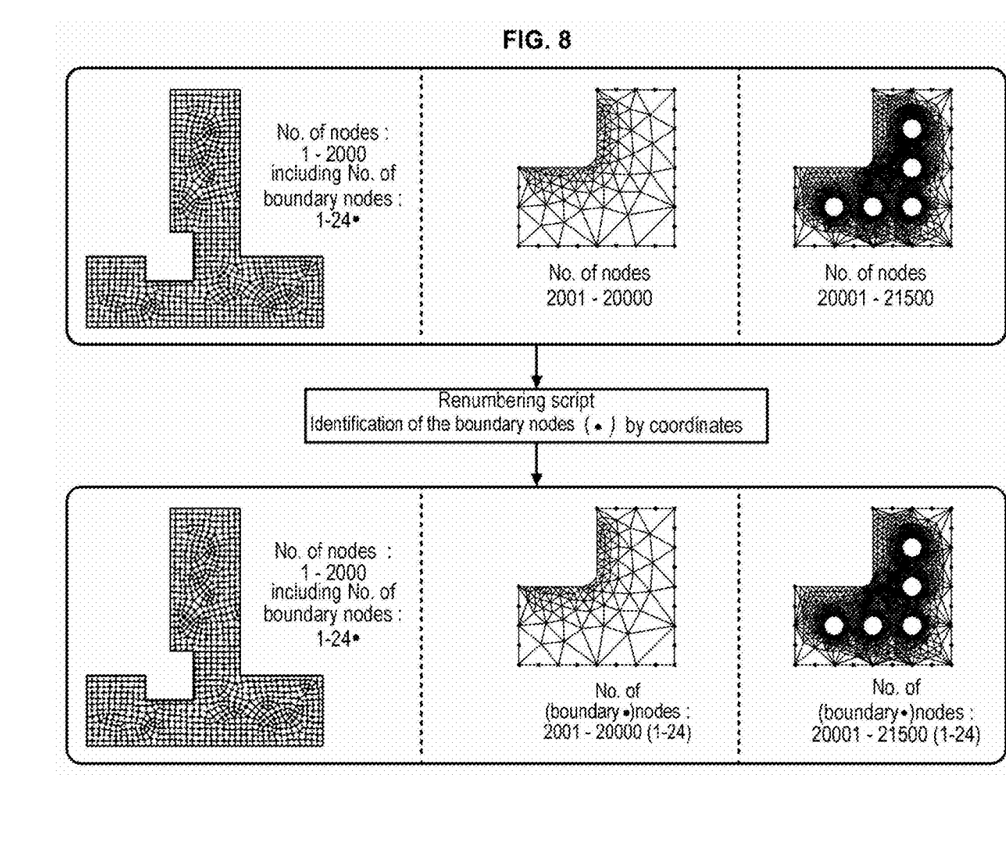
FIG. 8 represents a strategy of renumbering the nodes of the lattices according to the invention.

In FIG. 8, a particular feature of the overlay is illustrated for setting up the exchanges between the boundaries of each model. It is not necessary for the lattice of these models to be identical, since the nodes not present in a model are interpolated. However, it is essential that the various nodes between the lattices of the models bear different numbers. On the other hand, the numbering of the nodes on the boundaries must be identical for the lattices of the global, local and auxiliary models, in order for the exchanges of information to be correct.

A script is therefore used, preferably in Python in order to handle this particular feature automatically. The method of calculation 300 is thus applicable to complex lattices (1 million nodes, for the most advanced example (3D)) where a manual approach is inconceivable. In order to avoid problems regarding the orientation of the elements that may harm the accuracy of the converged solution, the lattice of the complementary area is chosen as the basis of numbering (in particular its boundary nodes).

The invention claimed is:

1. A method of simulating behavior of a structure by iterative and incremental finite element calculation, implemented by a computer including code instructions for executing said method, in which a global model is used representing said structure, a local model representing an area of said structure including geometric details, an auxiliary model representing said area without said geometric details, said method comprising:
a) applying a current value of a loading function to the global model, the loading function depending on time and comprising local extrema;
b) determining by finite element calculation in the global model a nodal displacement field corresponding to the current value of the loading function;
c) applying the nodal displacement field thus determined to the local and auxiliary models and determining corresponding forces in the local model and corresponding force in the auxiliary model;
d) testing a convergence of a solution obtained for the global model, and if a convergence indicator is achieved, the method is resumed at step a), the current value being replaced by a next value taken by the loading function after the current value; otherwise,
e) calculating a difference between the forces in the local model and the forces in the auxiliary model to determine a correction and, after the calculating, applying the correction in the global model, the processing is resumed at step c) with the nodal displacement field calculated in the global model after implementation of said correction;
f) determining values of internal variables from the calculations performed in the global model and/or in the local model for the different loading increments; and
g) assessing an evolution in the behavior of the structure over time as a function of said values of internal variables,
wherein steps c), d), and e) of correction and convergence testing of the global model are applied when the current value of the loading function corresponds to one of the local extrema of the loading function.

2. The method of simulating the behavior of a structure by iterative and incremental finite element calculation as claimed in claim 1, in which the global model models a nonlinear behavior of the structure.

3. The method of simulating the behavior of a structure by iterative and incremental finite element calculation as claimed in claim 1, in which the local and auxiliary models model a nonlinear behavior of the structure.

4. The method of simulating the behavior of a structure by iterative and incremental finite element calculation as claimed in claim 1, in which the local and auxiliary models include a set of peripheral nodes defining a boundary and in which the correction applied to the global model comprises an additional loading on the nodes of the global model located on said boundary.

5. The method of simulating the behavior of a structure by iterative and incremental finite element calculation as claimed in claim 1, in which the calculation of a correction to be applied to the global model is determined by an overlay of a finite element software program.

6. The method of simulating the behavior of a structure by iterative and incremental finite element calculation as claimed in claim 5, in which wherein in step d) if a convergence indicator is achieved,
a global solution of the global model is recorded,
a local solution of the local model is recorded, and
an auxiliary solution of the auxiliary model is recorded,
the method is resumed at step a), the current value being replaced by a next value taken by the loading function after the current value, the overlay using a finite element software recalculation function so that
calculation in the global model in following step b) is started from the global solution, applying the nodal displacement field to the local model in following step c) is started from the local solution, and
applying the nodal displacement field to the auxiliary model in following step c) is started from the auxiliary solution.

7. The method of simulating the behavior of a structure by iterative and incremental finite element calculation as claimed in claim 1, in which step c) comprises the use of a convergence acceleration method.

8. The method of simulating the behavior of a structure by iterative and incremental finite element calculation as claimed in claim 7, in which the convergence acceleration method is a quasi-Newton method or based on Aitken's $\delta^2$.

9. The method of simulating the behavior of a structure by iterative and incremental finite element calculation as claimed in claim 1, in which the structure includes parts in the field of aeronautics.

10. The method of simulating the behavior of a structure by iterative and incremental finite element calculation as claimed in claim 1, in which the structure includes turbine engine parts.

11. The method of simulating the behavior of a structure by iterative and incremental finite element calculation as claimed in claim 1, wherein the step of testing comprises a determination of a difference between the nodal displacement field and a previously calculated nodal displacement field.

12. The method of simulating the behavior of a structure by iterative and incremental finite element calculation as claimed in claim 1, wherein the step of testing comprises:
calculating the difference between the forces in the local model and the forces in the auxiliary model to determine the correction and
determining a difference between the correction and a previously calculated correction.

13. The method of simulating the behavior of a structure by iterative and incremental finite element calculation as claimed in claim 1, wherein for each loading, the nodal displacement field corresponding to the loading is determined and the nodal displacement field is applied to the local and auxiliary models.

14. The method of simulating the behavior of a structure by iterative and incremental finite element calculation as claimed in claim 1, wherein the loading increment is calculated in relation to a behavior history of the structure.

15. The method of simulating the behavior of a structure by iterative and incremental finite element calculation as claimed in claim 14, wherein the behavior history comprises an evolution of the internal variables.

16. A non-transitory computer readable medium storing computer instructions for executing a method of simulating behavior of a structure by iterative and incremental finite element calculation when said program is executed on a computer, in which a global model is used representing said structure, a local model representing an area of said structure including geometric details, an auxiliary model representing said area without said geometric details, said method comprising:
- a) applying a current value of a loading function to the global model, the loading function depending on time and comprising local extrema;
- b) determining by finite element calculation in the global model a nodal displacement field corresponding to the current value of the loading function;
- c) applying the nodal displacement field thus determined to the local and auxiliary models and determining corresponding forces in the local model and corresponding force in the auxiliary model;
- d) testing a convergence of a solution obtained for the global model, and if a convergence indicator is achieved, the method is resumed at step a), the current value being replaced by a next value taken by the loading function after the current value; otherwise,
- e) calculating a difference between the forces in the local model and the forces in the auxiliary model to determine a correction and, after the calculating, applying the correction in the global model, the processing is resumed at step c) with the nodal displacement field calculated in the global model after implementation of said correction;
- f) determining values of internal variables from the calculations performed in the global model and/or in the local model for the different loading increments; and
- g) assessing an evolution in the behavior of the structure over time as a function of said values of internal variables, wherein steps c), d), and e) of correction and convergence testing of the global model are applied when the current value of the loading function corresponds to one of the local extrema of the loading function.

* * * * *

UNITED STATES PATENT AND TRADEMARK OFFICE
CERTIFICATE OF CORRECTION

PATENT NO. : 11,244,093 B2
APPLICATION NO. : 15/923126
DATED : February 8, 2022
INVENTOR(S) : Geoffrey Juan Desmeure et al.

It is certified that error appears in the above-identified patent and that said Letters Patent is hereby corrected as shown below:

In the Specification

In Column 5, Line 20, delete "$\lambda_{\Gamma A}$" and insert -- $\lambda_{\Gamma,A}$ --, therefore.

In Column 7, Line 28, delete "6B," and insert -- 6B --, therefore.

In the Claims

In Column 10, Claim 6, Line 19, delete "in which".

Signed and Sealed this
Twenty-first Day of June, 2022

*Katherine Kelly Vidal*

Katherine Kelly Vidal
*Director of the United States Patent and Trademark Office*